United States Patent [19]

Van Tol

[11] 3,833,221

[45] Sept. 3, 1974

[54] BOARD GAME APPARATUS

[76] Inventor: Adrianus Gijsbertus Van Tol, Mimosastraat 31, Den Haag, Netherlands

[22] Filed: Apr. 26, 1973

[21] Appl. No.: 354,657

[52] U.S. Cl...... 273/134 C, 273/134 GB, 273/131 K

[51] Int. Cl. .............................................. A63f 3/00

[58] Field of Search............................. 273/131, 134

[56] References Cited

UNITED STATES PATENTS 3,643,957 2/1972 Bryant......................... 273/134 AD

*Primary Examiner*—Delbert B. Lowe

[57] ABSTRACT

A game comprising a playing surface divided into a plurality of areas, some of said areas having identifying marks. Valued pieces identified as to value and as to location are positioned on particular marked areas. A plurality of route following pawns are provided for each player for moving on the playing surface along a particular route. The route of the pawns is determined by route charts, each chart indicating portions of the route to be followed. Points are accumulated by the players when their pawns capture an opponent's pawns or valued pieces during their movement.

12 Claims, 8 Drawing Figures

BOARD GAME APPARATUS

SUMMARY OF THE INVENTION

The invention has for its object to provide a game outfit permitting of playing an attractive game and offering many possibilities which the players can act upon.

According to the invention, identified valued pieces are provided for positioning upon marked areas of a playing surface, and pawns are provided for each player. The playing surface is divided into many areas for receiving the valued pieces and the players' pawns. Additionally, route charts are provided to indicate to the player portions of the route along which he may move his pawns.

The players can draw a route chart, for example, in turn and determine on the basis of this route chart and the situation of the game which of their pawns they will move in accordance with the route indicated.

BRIEF DESCRIPTION OF THE DRAWINGS

The invention will now be described more fully with reference to an embodiment of a game outfit embodying the invention illustrated in the accompanying drawings.

DESCRIPTION OF THE PREFERRED EMBODIMENTS

Figure 1:
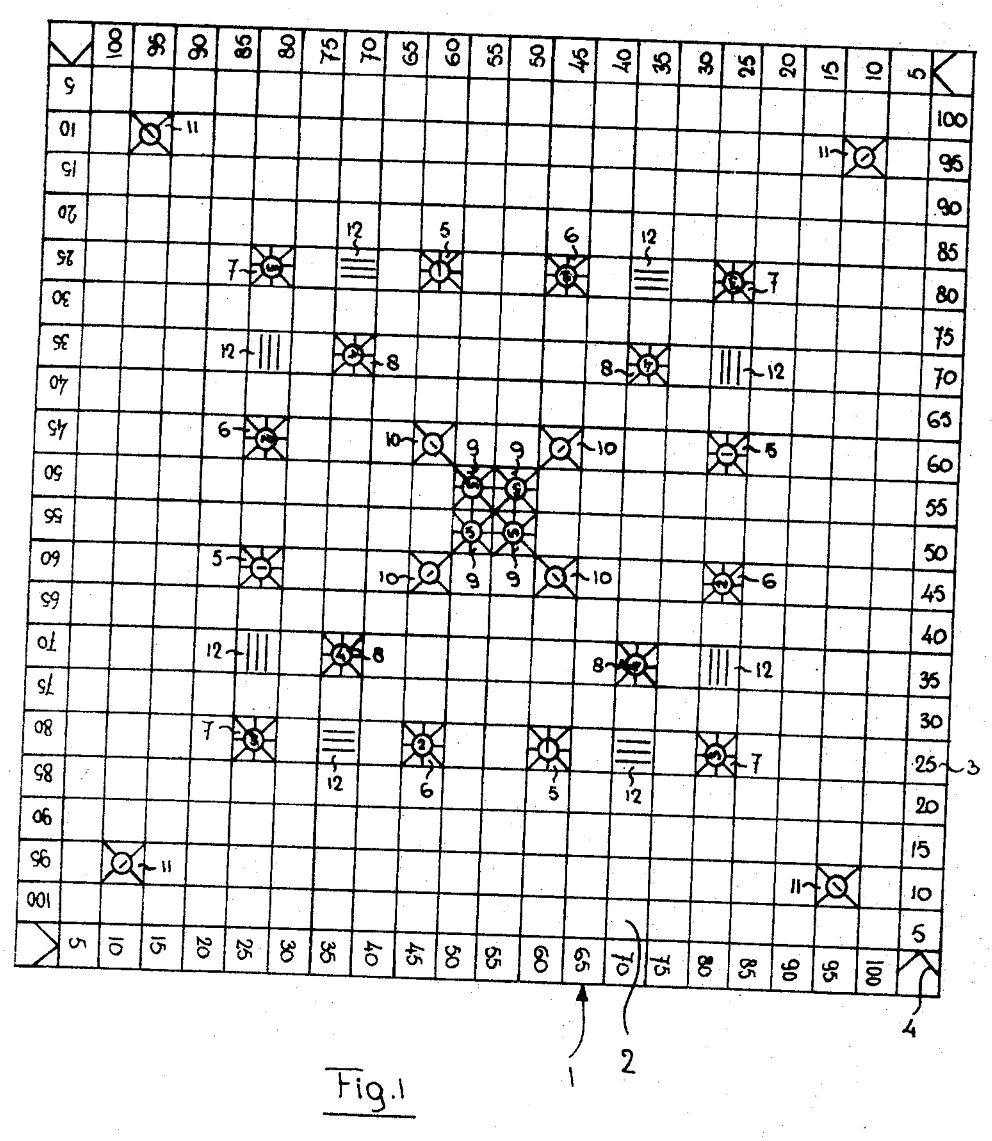
FIG. 1 shows an embodiment of a play board or chart.

In the embodiment shown the play chart or board 1 has a rectangular shape and is subdivided into 400 fields or areas 2. Along each side of the board an ascending row of numbers 3 is indicated, each number of the row 3 indicating an evaluation in points for the row of fields 2 on the left-hand side of this number. Beneath the row of numbers an arrow 4 indicates the normal forward direction of play for the player having on his right hand the row of numbers 3 indicated above the arrow 4 concerned.

FIG. 1 shows furthermore that a number of the fields 2 are marked in a particular manner.

There are, for example, four fields 5 intended for receiving valued pieces "1" (not shown), four fields 6 for receiving valued pieces "2" (not shown), four fields 7 for receiving valued pieces "3" (not shown), four fields 8 for receiving valued pieces "4" (not shown) and four fields 9 for receiving valued pieces "5" (not shown). Although the valued pieces are designated above by digits, they may, of course, also be identified, apart from digits, by colours or shapes, which colours or shapes may also be provided on the respective fields of the chart or board. The valued pieces ("1" to "5") have different values. For example, valued pieces ("1") have the lowest value while the valued pieces ("5") have the highest value.

From FIG. 1 it will be apparent that the fields 5 to 7 are arranged in rows parallel to the edges of the chart or board, whereas the fields 8 are nearer the centre of the board. The fields 9 constitute the four central, joined fields of the board, where the valued pieces of maximum value are disposed. The value of the valued pieces to be put down on the other fields 5 to 8 gradually decreases.

FIG. 1 shows furthermore that the fields 10 joining solely the corners of the rectangle formed by the four fields 9 are also marked, whilst correspondingly marked fields 11 are provided near the corners of the board or chart.

For playing the game the various valued pieces are disposed on the fields 5 to 9. Each player receives, for example, nine pawns having a special colour, shape or mark individual for each player. If the pawns have a special colour, the arrow 4 on the right-hand side of the player and the row of digits above the same may have the same colour. The pawns of the player are arranged at selected places on the row of fields lying lowermost with respect to the player concerned, for example, above the evaluation numbers 10, 20, 30, 40, 55, 65, 75, 85, 95 of the row of numbers which forms the lower side of the board or chart for the player concerned.

Figure 2:
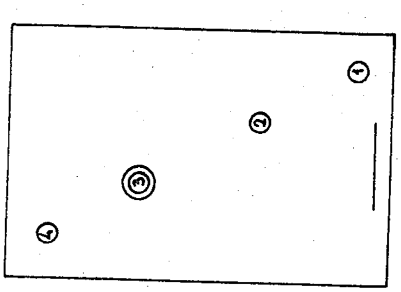

The game is played preferably by two to four persons. After the order of succession of playing has been determined, for example, with the aid of a die, each player receives in turn a route chart. The route charts may be distributed by one of the players in a given order of succession or a player may draw a route chart out of a stack of route charts. On each route chart it is prescribed how a player has to displace one of his pawns. The route chart of FIG. 2 shows, for example, that the player has to move one of his pawns diagonally across the chart or board, it being allowed to take four steps indicated by the digits 1, 2, 3 and 4. In the example shown in FIG. 2 the digits 1, 2 and 4 are encircled once, whereas the digit 3 is encircled twice. The double circle around the digit 3 indicates that if a valued piece or a pawn of another player is present on the third field which is attained by the pawn of the player concerned during the move indicated by the route chart, the player can capture this piece or pawn. Pieces and pawns standing in fields which are indicated on the route chart by means of digits which have not been encircled twice, may not be captured.

Figure 4:
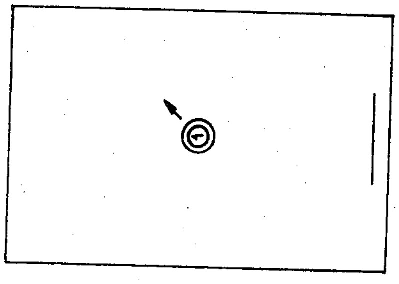
FIGS. 2 to 7 show various embodiments of charts with route descriptions.
Figure 3:
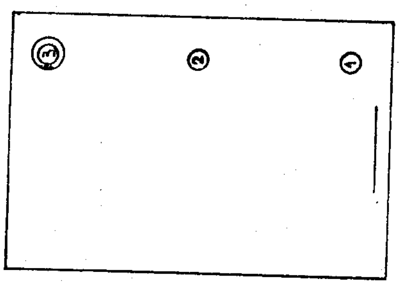

In a similar manner FIG. 3 shows a route for a rectilinear upward move across three fields. FIG. 4 shows that a pawn is allowed to move only by one field, the direction being indicated by the arrow. A pawn present in the field chosen can be captured.

Figure 6:
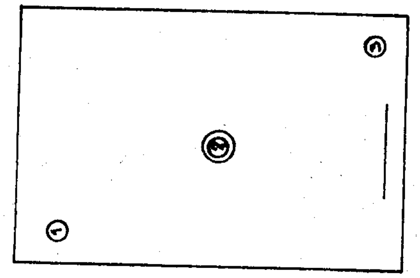
Figure 5:
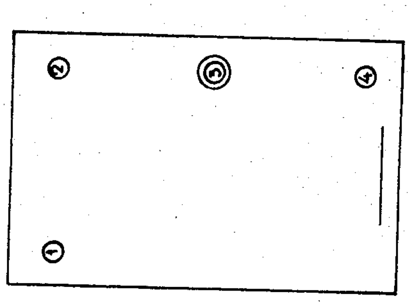

The description of the route of FIG. 5 shows that a pawn has first to be moved to the right over two fields and subsequently over two fields in downward direction or towards the player, whilst any pawn or piece on the third field traversed can be captured. The route indicated in FIG. 6 shows that a pawn has to be moved back diagonally over three fields towards the player. Any pawn or piece present on the second field passed by the moving pawn can be captured.

Figure 7:
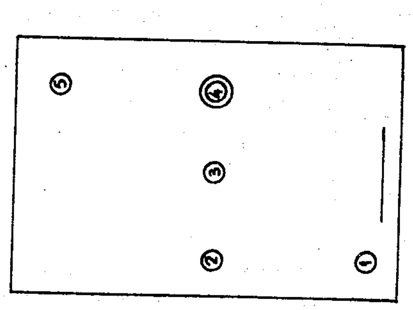

The route shown in FIG. 7 prescribes a first move over two fields upwards, then over two fields to the right and again one field upwards, whilst any pawn located in the fourth field to be passed by may be captured. The position of the digits on the route chart indicates whether the pawn has to be moved upwards or downwards, but for the sake of clarity a further line is drawn on the route chart to orient the chart by indicating the lower side of the route chart.

It will be obvious that in this way a very great number of different routes can be indicated on the various route charts.

It is left to the player to decide which of his pawns he will move in accordance with the prescribed route. The player will decide on the basis of the development of the game, his intention being to obtain an optimum displacement of his pawns in order to attain a maximum number of points. He has to take care to avoid, as far as possible, the fields 10, since if a pawn of a player gets in one of the fields 10 this pawn has to be moved back to a correspondingly marked field 11 near the lower edge of the chart or board.

If a player captures a pawn of one of the other players he obtains the number of points as printed in the row 3 on the board on the right hand side of the other player and opposite the captured pawn. When a player's pawn reaches his uppermost field (across from number 100 in row 3), he obtains 100 points, and the pawn concerned can no longer be taken. Also, the player may claim back one of his pawns already taken, which pawn he is allowed to put on one of the marked fields 12 located at the same height on the board or chart as the fields 5 to 7.

A player cannot move a pawn outside the playing field. If a route selected by a player would place the pawn outside the playing field, he must stop at the boundary of the playing field and take a 25 point penalty. If at the beginning of the game a player gets a route chart calling for a downward movement outside the boundary, he receives a 25 point penalty and must wait for another turn. If moving a pawn in accordance with the route description would move it across the upper edge of the playing field, the pawn has to remain on the top line, and the player receives only 75 points rather than the usual 100 points.

If all valued pieces have been captured, the game has been finished. Apart from the points already gained during the game, the player obtains a number of points for each pawn as indicated by the number in the row of numbers 3 which is opposite the player's pawn.

Figure 8:
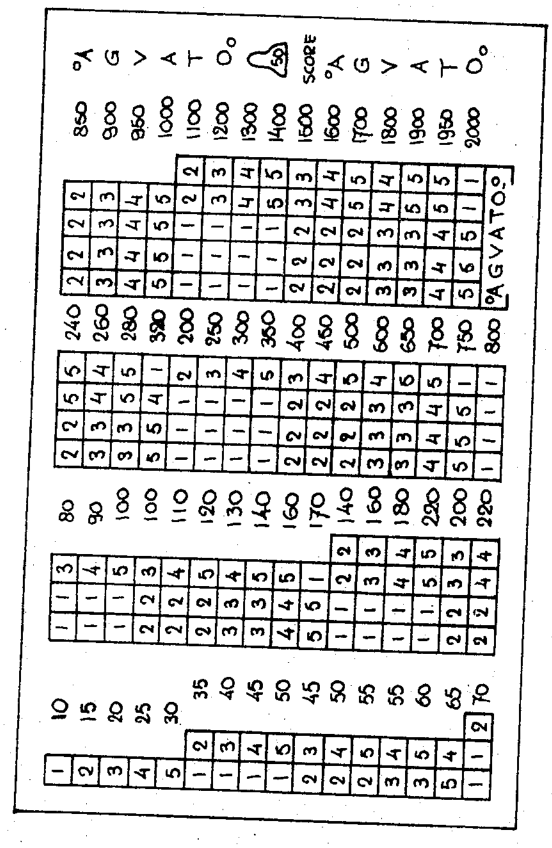
FIG. 8 shows a chart with a table for determining the value of the game pieces gained.

The number of points obtained for the valued pieces captured by a player is determined on the basis of the table of FIG. 8. It will be apparent that for various combinations of captured valued pieces different numbers of points are given. For example, the player having two valued pieces "1" and two valued pieces "4" gets 180 points; if he has three valued pieces "3" and one valued piece "5" he gets 650 points and with three valued pieces "3" and two valued pieces "5" he gets 1900 points.

It will be obvious that during the game the players will attempt to capture an optimum combination of valued pieces. Since the players themselves can determine which of their pawns they will move along the prescribed routes they can strongly influence the course of the game. Further, the availability of particular routes will depend upon which routes have already been drawn by the players. Thus, in determining their game strategy, the players must consider the availability of routes remaining in order to optimize the probability of obtaining a route capable of capturing a valued piece.

I claim:

1. A game comprising:

a playing surface divided into a plurality of areas, some of said areas having identifying marks;

valued pieces identified as to value and as to location on particular ones of the marked areas on which they are placed;

a plurality of route following pawns for each player identified as to each player for moving on said playing surface; and a plurality of route charts, each indicating portions of the route to be followed by said pawns, whereby the players obtain points by moving said pawns along the route indicated by said charts and capturing said valued pieces.

2. The game as claimed in claim 1 including a member displaying a list of the numbers of points obtained for combinations of valued pieces captured by the players.

3. The game as claimed in claim 1, wherein said route charts include indications of positions on said route where said valued pieces and/or said pawns can be captured.

4. The game as claimed in claim 3, wherein said route charts have numbers positioned to show the sequence and directions of the moves of a pawn along its route.

5. The game as claimed in claim 4, wherein said indications of capture positions comprise marks adjacent selected ones of said numbers.

6. The game as claimed in claim 1, wherein said route charts include means indicating their orientation.

7. The game as claimed in claim 1, wherein said marked areas include a plurality of central fields located adjacent the center of said surface, said central fields being identified to locate said valued pieces of maximum value.

8. The game as claimed in claim 7, wherein said marked areas include:

relocation areas adjacent the circumference of said surface;

and reject areas adjacent said central fields, whereby pawns moving to said reject areas are required to be moved to said relocation areas.

9. The game as claimed in claim 1, wherein said marked areas include:

restart areas in which recaptured pawns are to be restarted along a route.

10. The game as claimed in claim 1, including numbers on said playing surface adjacent its periphery identifying corresponding rows of said areas.

11. The game as claimed in claim 10, including an arrow adjacent said periphery of said playing surface for indicating the forward direction of play for each player.

12. A game comprising:

a rectangular playing surface divided into a plurality of rectangular areas arranged in rows, some of said areas having identifying marks;

valued pieces identified as to value and as to location on particular ones of the marked areas on which they are placed;

a plurality of route following pawns for each player identified as to each player for following a route on said playing surface; and a plurality of route charts, each indicating portions of the route to be followed by said pawns, said charts having numbers positioned to show the sequence and directions of the moves of a pawn along its route and indications adjacent said numbers showing positions on said route where valued pieces and pawns may be captured.

* * * * *